(12) United States Patent
Sharifi Mehr et al.

(10) Patent No.: US 10,460,097 B2
(45) Date of Patent: *Oct. 29, 2019

(54) MALICIOUS CLIENT DETECTION BASED ON USAGE OF NEGOTIABLE PROTOCOLS

(71) Applicant: Amazon Technologies, Inc., Seattle, WA (US)

(72) Inventors: Nima Sharifi Mehr, Vancouver (CA); Eric Desmond Keith Villiers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,692

(22) Filed: Aug. 28, 2017

(65) Prior Publication Data

US 2017/0359329 A1 Dec. 14, 2017

Related U.S. Application Data

(63) Continuation of application No. 14/472,002, filed on Aug. 28, 2014, now Pat. No. 9,749,305.

(51) Int. Cl.
*G06F 21/00* (2013.01)
*G06F 21/44* (2013.01)
*G06F 21/60* (2013.01)
*H04L 29/06* (2006.01)

(52) U.S. Cl.
CPC ............ *G06F 21/44* (2013.01); *G06F 21/606* (2013.01); *H04L 63/126* (2013.01); *H04L 63/1441* (2013.01)

(58) Field of Classification Search
CPC ...................................................... H04L 63/08
See application file for complete search history.

(56) References Cited

U.S. PATENT DOCUMENTS

| 8,340,283 | B2 | 12/2012 | Nadalin et al. | |
| 8,621,618 | B1 | 12/2013 | Ramsey et al. | |
| 2006/0143700 | A1* | 6/2006 | Herrmann | H04L 63/0823 726/14 |
| 2006/0282545 | A1* | 12/2006 | Arwe | G06F 8/71 709/237 |
| 2009/0003663 | A1 | 1/2009 | Webster | |
| 2009/0094671 | A1 | 4/2009 | Kurapati et al. | |

(Continued)

OTHER PUBLICATIONS

Santesson, S., "TLS Handshake Message for Supplemental Data," Request for Comments: 4680, Standards Track, Sep. 2006, 10 pages.

(Continued)

*Primary Examiner* — Izunna Okeke
(74) *Attorney, Agent, or Firm* — Davis Wright Tremaine LLP

(57) ABSTRACT

A destination server communicates with a computer system using cryptographically protected communications utilizing a first negotiable feature. The destination server detects a triggering event and, in response to the triggering event, causes the cryptographic protected communications with the computer system to change from the first negotiable feature to a second negotiable feature. As a result of stored data indicating that the computer system fails to support the second negotiable feature, the destination server initiates a security measure.

20 Claims, 10 Drawing Sheets

(56) References Cited

U.S. PATENT DOCUMENTS

| | | |
|---|---|---|
| 2011/0185421 A1 | 7/2011 | Wittenstein et al. |
| 2014/0196108 A1 | 7/2014 | Barr et al. |
| 2017/0012988 A1 | 1/2017 | Turgeman et al. |

OTHER PUBLICATIONS

Santesson, S., et al., "TLS User Mapping Extension," Request for Comments: 4681, Standards Track, Oct. 2006, 11 pages.
Taylor, D., et al., "Using the Secure Remote Password (SRP) Protocol for TLS Authentication," Request for Comments: 5054, Informational, Nov. 2007, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Turner, S., and T. Polk, "Prohibiting Secure Sockets Layer (SSL) Version 2.0," Request for Comments: 6176, Standards Track, Mar. 2011, 4 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Atkinson, R., "Security Architecture for the Internet Protocol," Request for Comments: 1825, Standards Track, Aug. 1995, 23 pages.
Blake-Wilson, S., et al., "Elliptic Curve Cryptography (ECC) Cipher Suites for Transport Layer Security (TLS)," Request for Comments: 4492, Informational, May 2006, 36 pages.
Blake-Wilson, S., et al., "Transport Layer Security (TLS) Extensions," Request for Comments: 3546, Standards Track, Jun. 2003, 28 pages.
Blake-Wilson, S., et al., "Transport Layer Security (TLS) Extensions," Request for Comments: 4366, Standards Track, Apr. 2006, 29 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Bowen, P. Z., "Detection of Modified Requests," U.S. Appl. No. 15/178,385, filed Jun. 9, 2016.
Brown, M., and R. Housley, "Transport Layer Security (TLS) Authorization Extensions," Request for Comments: 5878, Experimental, May 2010, 19 pages.
Chown, P., "Advanced Encryption Standard (AES) Ciphersuites for Transport Layer Security (TLS)," Request for Comments: 3268, Standards Track, Jun. 2002, 8 pages.
Dierks et al., "The TLS Protocol Version 1.0," Request for Comments 2246, Jan. 1999, 75 pages.
Dierks, T., and E. Rescorla, "The Transport Layer Security (TLS) Protocol Version 1.2," Request for Comments: 5246, Standards Track, Aug. 2008, 98 pages.
Durumeric, Z., et al., "The Security Impact of HTTPS Interception," Network and Distributed Systems Symposium, Feb. 26-Mar. 1, 2017, San Diego, California, 14 pages.
Eastlake, "Transport Layer Security (TLS) Extensions: Extension Definitions," Request for Comments: 6066, Standards Track, Jan. 2011, 25 pages.
Eronen, P., and H. Tschofenig, "Pre-Shared Key Ciphersuites for Transport Layer Security (TLS)," Request for Comments: 4279, Standards Track, Dec. 2005, 16 pages.
Ford-Hutchinson, P., "Securing FTP with TLS," Request for Comments: 4217, Standards Track, Oct. 2005, 29 pages.
Friend, R., "Transport Layer Security (TLS) Protocol Compression Using Lempel-Ziv-Stac (LZS)," Request for Comments: 3943, Informational, Nov. 2004, 13 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

Hoffman, P., "SMTP Service Extension for Secure SMTP over Transport Layer Security," Request for Comments: 3207, Standards Track, Feb. 2002, 9 pages.
Hollenbeck, S., "Transport Layer Security Protocol Compression Methods," Request for Comments: 3749, Standards Track, May 2004, 8 pages.
Holt, M., "Detecting HTTPS Interception, User Guide," Caddy, © 2015-2017 Light Code Labs, <https://caddyserver.com/docs/mitm-detection> [retrieved Jul. 20, 2017], 10 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kanno, S., and M. Kanda, "Addition of the Camellia Cipher Suites to Transport Layer Security (TLS)," Request for Comments: 6367, Informational, Sep. 2011, 9 pages.
Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent et al., "Security Architecture for the Internet Protocol," Request for Comments: 2401, Standards Track, Nov. 1998, 62 pages.
Kent, S., "IP Encapsulating Security Payload (ESP)," Request for Comments: 4303, Standards Track, Dec. 2005, 45 pages.
Kent, S., and K. Seo, "Security Architecture for the Internet Protocol," Request for Comments: 4301, Standards Track, Dec. 2005, 102 pages.
Khare et al., "Upgrading to TLS within HTTP/1.1," Request for Comments: 2817, Standards Track, May 2000, 13 pages.
Kim, W., et al., "Addition of the ARIA Cipher Suites to Transport Layer Security (TLS)," Request for Comments: 6209, Informational, Apr. 2011, 10 pages.
Lee et al., "Addition of SEED Cipher Suites to Transport Layer Security (TLS)," Request for Comments: 4162, Standards Track, Aug. 2005, 6 pages.
Mavrogiannopoulos, N., "Using OpenPGP Keys for Transport Layer Security (TLS) Authentication," Request for Comments: 5081, Experimental, Nov. 2007, 9 pages.
Mavrogiannopoulos, N., and D. Gillmor, "Using OpenPGP Keys for Transport Layer Security (TLS) Authentication," Request for Comments: 6091, Informational, Feb. 2011, 9 pages.
McGrew, D., and D. Bailey, "AES-CCM Cipher Suites for Transport Layer Security (TLS)," Request for Comments: 6655, Standards Track, Jul. 2012, 8 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Medvinsky, A., et al., "Addition of Kerberos Cipher Suites to Transport Layer Security (TLS)," Request for Comments: 2712, Standards Track, Oct. 1999, 7 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Metzger, P., et al., "IP Authentication Using Keyed MD5," Request for Comments: 1828, Standards Track, Aug. 1995, 6 pages.
Moriai, S., et al., "Addition of Camellia Cipher Suites to Transport Layer Security (TLS)," Request for Comments: 4132, Standards Track, Jul. 2005, 8 pages.
Newman, C., "Using TLS with IMAP, POP3 and ACAP," Request for Comments: 2595, Standards Track, Jun. 1999, 16 pages.
Orman, H., "The OAKLEY Key Determination Protocol," Request for Comments: 2412, Informational, Nov. 1998, 56 pages.
Phelan, T., "Datagram Transport Layer Security (DTLS) over the Datagram Congestion Control Protocol (DCCP)," Request for Comments: 5238, Standards Track, May 2008, 11 pages.
Rescorla, E., "HTTP Over TLS," Request for Comments: 2818, Informational, May 2000, 8 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., and N. Modadugu, "Datagram Transport Layer Security Version 1.2," Request for Comments: 6347, Standards Track, Jan. 2012, 33 pages.

(56) References Cited

OTHER PUBLICATIONS

Rescorla, E., and N. Modadugu, "Datagram Transport Layer Security," Request for Comments: 4347, Standards Track, Apr. 2006, 26 pages.

Rescorla, E., et al., "Transport Layer Security (TLS) Renegotiation Indication Extension," Request for Comments: 5746, Standards Track, Feb. 2010, 16 pages.

Salowey, J., et al., "AES Galois Counter Mode (GCM) Cipher Suites for TLS," Request for Comments: 5288, Standards Track, Aug. 2008, 9 pages.

Salowey, J., et al., "Transport Layer Security (TLS) Session Resumption without Server-Side State," Request for Comments: 5077, Standards Track, Jan. 2008, 21 pages.

Salter, M., and R. Housley, "Suite B Profile for Transport Layer Security (TLS)," Request for Comments: 6460, Informational, Jan. 2012, 15 pages.

\* cited by examiner

FIG. 5

User-Agent Database

| User-Agent Header | Known Negotiable Features | Observed Instances | Score |
|---|---|---|---|
| Mozilla/5.0 (Windows NT 6.1; WOW64) AppleWebKit/537.36 (KHTML, like Gecko) Chrome/36.0.1985.143 Safari/537.36 | Cipher Suite A | 9,458,276 | A |
| | Cipher Suite B | 3,584,213 | B |
| | Cipher Suite C | 1,638 | F |
| Wget/1.11.4 | Cipher Suite α | 15,894,977 | A |
| | Cipher Suite β | 3,475 | F |
| | Cipher Suite Y | 1,647,582 | C |
| Mozilla/5.0 (Macintosh; Intel Mac OS X 10_8_3) AppleWebKit/536.29.13 (KHTML, like Gecko) Version/6.0.4 Safari/536.29.13 | Cipher Suite A | 62 | F |
| | Cipher Suite B | 16,222,176 | A |
| | Cipher Suite C | 17,582,139 | A |
| Mozilla/5.0 (Windows NT 6.3; WOW64) AppleWebKit/537.36 (KHTML, like Gecko) Chrome/36.0.1985.125 Safari/537.36 | Cipher Suite A | 4,326,894 | B |
| | Cipher Suite B | 5,584,965 | B |
| | Cipher Suite C | 157,258 | D |

MALICIOUS CLIENT DETECTION BASED ON USAGE OF NEGOTIABLE PROTOCOLS

CROSS REFERENCE TO RELATED APPLICATIONS

This application is a continuation of U.S. patent application Ser. No. 14/472,002, filed Aug. 28, 2014, entitled "MALICIOUS CLIENT DETECTION BASED ON USAGE OF NEGOTIABLE PROTOCOLS," the disclosure of which is hereby incorporated herein in its entirety.

BACKGROUND

Computer network server administrators often implement various mechanisms to prevent the exploitation of a network server and other computer systems by hackers and other nefarious entities. For instance, many defensive mechanisms used to prevent such exploitation of network servers often involve use of application layer information to verify the authenticity of a client attempting to communicate with the network server. For example, Hypertext Transfer Protocol Secure (HTTPS) requests include an informational field usable by the network server to determine the application (user agent) utilized by a client to access the network server. However, such application layer information may be easily manipulated to any value making it difficult for server administrators to determine whether the application layer information is legitimate or not.

BRIEF DESCRIPTION OF THE DRAWINGS

Various embodiments in accordance with the present disclosure will be described with reference to the drawings, in which:

FIG. 5 shows an illustrative example of a database specifying one or more entries for each user-agent header analyzed by the network security service;

DETAILED DESCRIPTION

Figure 1:
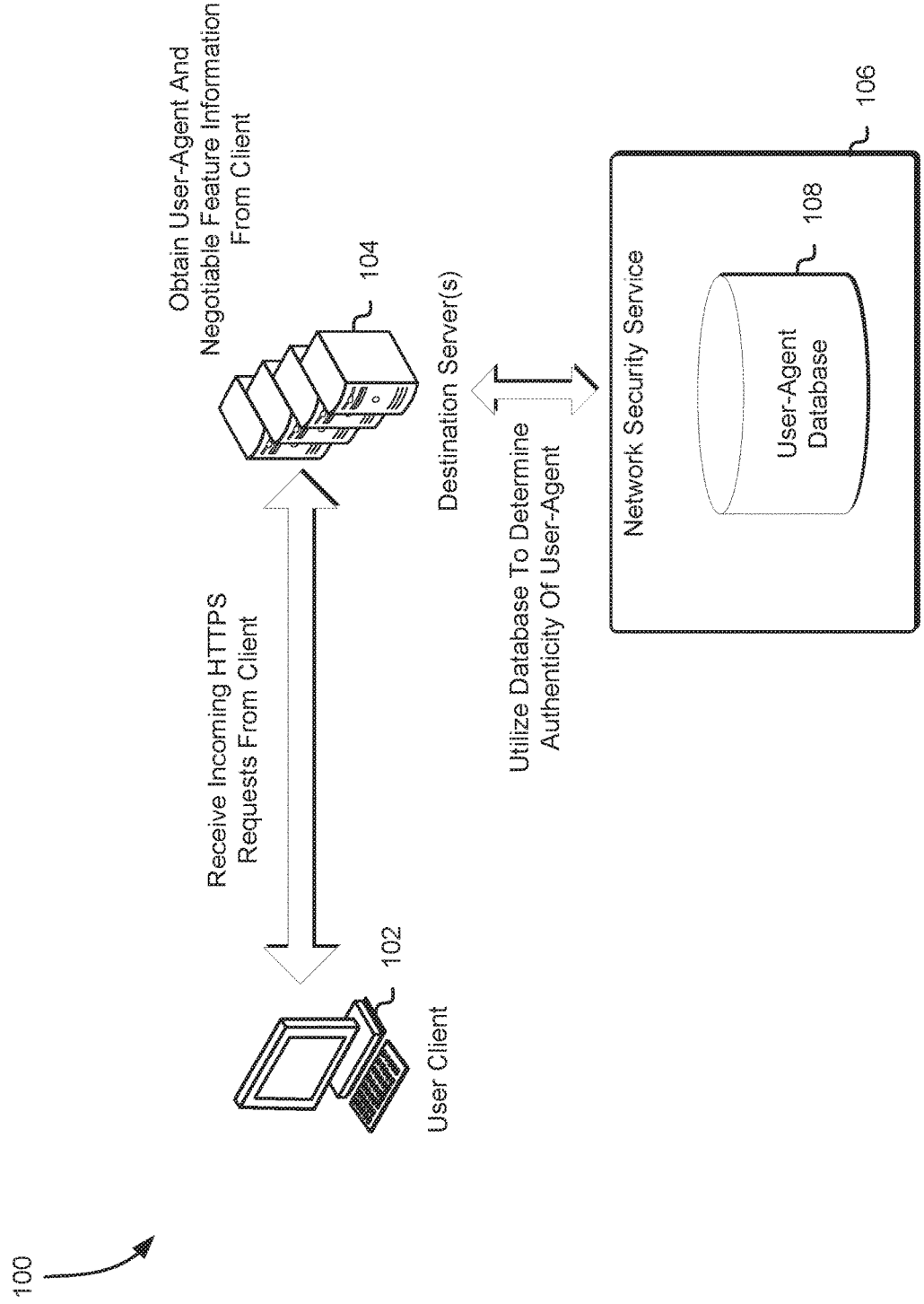
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the correlation of user-agents reported by user client applications and transport layer security (TLS) or secure sockets layer (SSL) features (e.g., negotiable features) of established communications channels. In an embodiment, a network server receives a request from a user client to establish a secure communications channel to enable transmission of encrypted data through the channel from the user client to the network server and vice versa. The request may include user-agent information specifying the user client application utilized to communicate with the network server, as well as negotiable features, such as a cipher suite, that may be used by the network server to communicate with the user client through the secure communications channel. The user client may be maintained and operated by a customer of an entity managing the network server, a nefarious user attempting to surreptitiously access proprietary data within the network server or some other user capable of utilizing an application to communicate with the network server.

When the network server receives the user-agent and negotiable feature information from the user client, the network server may access a user-agent database to determine whether the specified negotiable features correspond to the user-agent claimed by the user client. The user-agent database may include entries for each known user-agent and, for each user-agent entry, entries for expected negotiable features. The user-agent database may be maintained by a network security service, which may be a service configured to monitor incoming network traffic and prevent any network attacks. For instance, the network security service may utilize incoming networking traffic to build one or more profiles of user-agents and corresponding negotiable features. As more networking traffic is analyzed to identify user-agents and corresponding negotiable features, the network security service may be able to identify any expected negotiable features for a known user-agent specified by a user client.

In an embodiment, if the network security service and/or network server is unable to determine, based on the user-agent entry within the user-agent database, that the negotiable features specified within the user client request correspond to the specified user-agent, the network security service will flag the user client and perform any security measures. For instance, the network security service may terminate the user client's connection to the network server. Alternatively, the network security service may enable the user client to further communicate with the network server in a quarantined (e.g., sandboxed) environment, which may enable the network security service to obtain additional data from the flagged user client and utilize this data to enhance the security of the network service.

If the network security service and/or network service is able to determine that the negotiable features specified within the user client request do correspond to the specified user-agent, the network security service may enable the network server to complete the handshake process and establish the secure communications channel with the user client. In an embodiment, the network security service causes the network server to initiate a new TLS/SSL handshake at any time and exclude the previously provided negotiable features, thereby forcing the user client to have to specify a new set of negotiable features for the user-agent. For each new set of negotiable features, the network server may access the user-agent database and determine whether the specified negotiable features correspond to the provided user-agent. If they do not, then the network security service may flag the user client and perform additional security measures.

In this manner, a network server may be able to detect manipulated user-agent fields within a user client request to establish a secure network communication with the network server and take any necessary security precautions as a result of the detection. In addition, the techniques described and suggested herein facilitate additional technical advantages. For example, because the network security service may cause the network server to initiate a new TLS/SSL handshake at any time, the user client may not be able to forge the support for different negotiable features, making detection of a forged user-agent field easier for the network server and/or network security service. This, in turn, may result in a reduction of successful cyber-attacks on behalf of hackers and other nefarious entities.

FIG. 1 shows an illustrative example of an environment 100 in which various embodiments can be implemented. In the environment 100, a user client 102 may submit an application layer (e.g., HTTPS, file transfer protocol, etc.) request to a destination server 104 (e.g., network server) to establish a secure network communications channel, such as a TLS/SSL secure channel. The user client 102 may be a computer system that may include one or more applications installed on the computer system configured to access and communicate with a service made available through a destination server 104. The user client 102 may communicate with the destination server 104 through one or more communications networks, such as the Internet. The application layer request from the user client 102 may include an informational field, such as a user-agent field, which may be used by the destination server 104 to determine the application purportedly utilized by the user client 102 to transmit the request. For instance, the user-agent field may specify a browser application (e.g., Internet Explorer®, Firefox®, Chrome®, etc.) used by user client 102 to communicate with the destination server 104. Additionally, the user client 102 may specify, for the secure network communications session to be established, negotiable features (e.g., cipher suites, etc.) that may be utilized by the destination server 104 to communicate with the user client 102 through the secure communications channel. While user-agents and cipher suites are used extensively throughout the present disclosure for the purpose of illustration, other information relating to the client and the communications channel, including other attributes of the user client 102 and other features may be used.

The destination server 104 may be a web server configured to provide web pages viewable through a browser application. Alternatively, the destination server 104 may be a file server that may be configured to enable user clients 102 to access one or more files remotely through the secure communications channel. Generally, the destination server may be any server configured to establish a secure communications channel and implement various techniques described herein. The destination server 104 may utilize the received user-agent field and corresponding negotiable features from the user client 102 to determine whether the user-agent field has been manipulated, thereby providing an indication that the application utilized by the user client 102 is not authentic. The destination server 104 may transmit the received user-agent field and corresponding negotiable features to a network security service 106 for analysis. The network security service 106 may include a user-agent database 108, which may include user-agent entries for each known user-agent available and, for each user-agent entry, one or more negotiable feature entries corresponding to the user-agent entry. In an embodiment, the network security service 106 utilizes a request log to identify user-agent/cipher suite groups for network communications sessions over a particular period of time. Based at least in part on these identified groups, the network security service 106 may develop a confidence score for each of these groups, which may be recorded within the user-agent database 108. The confidence score may be based at least in part on the population (e.g., number of user-agent/cipher suite pairings for a particular group observed over the particular period of time) of each group.

The network security service 106 may provide the confidence score for the user-agent/cipher suite pairing provided by the destination server 104. If the confidence score is below a certain threshold, the destination server 104 may flag the user client 102 and perform any security measures to hinder the user client 102 from communicating through the secure channel with the destination server 104. For instance, the destination server 104 may terminate the communications session with the user client 102. In another instance, the network security service 106 may provide the destination server 104 with a security application, such as a Completely Automated Public Turing test to tell Computers and Humans Apart (CAPTCHA) challenge application, which the destination server 104 may transmit to the user client 102 through an application interface. If the user client 102 is unable to provide an adequate response to the security application, the destination server 104 may terminate the connection with the user client 102 or perform additional security measures. Additionally, or alternatively, the destination server 104 may block any further incoming transmissions originating from an Internet Protocol (IP) address associated with the user client 102.

If the destination server 104 is able to determine, such as through use of the network security service 106, that the user-agent/cipher suite pairing is indeed legitimate, the destination server 104 may establish the secure communications channel and enable further communications between the user client 102 and the destination server through the secure channel. In an embodiment, the network security service 106 transmits a request to the destination server 104 to initiate a new handshake procedure with the user client 102 and exclude the previously used cipher suite. This may cause the user client 102 to transmit a user-agent field and a new corresponding cipher suite to the destination server 104. Accordingly, the destination server 104 may transmit this new user-agent/cipher suite pairing to the network security service 106, which may cause the network security service 106 to determine a confidence score for this new pairing. Based at least in part on this new confidence score, the destination server 104 may flag the user client and perform certain security measures or enable further communications between the user client 102 and the destination server 104 through the secure channel.

In some embodiments, the network security service 106 may be accessible by both the user client 102 and the destination server 104. For instance, the network security service 106 may be made available to various customers, enabling these customers to utilize their user clients 102 to access the network security service 106 and verify any incoming network traffic. For example, as part of the TLS/SSL secure channel handshake process, the destination server 104 may transmit its own user-agent and cipher suite pairing to the user client 102. In response, the user client 102 may transmit this user-agent and cipher suite pairing to the network security service 106, which may access the user-agent database 108 and provide a confidence score for the pairing. This may enable the user client 102 to determine whether the destination server 104 is authentic and, if not, terminate the communications session with the destination server 104.

It should be noted that in some embodiments, the network security service 106 may not be a separate entity but rather may be incorporated into the destination server 104 or user client 102 as an integrated component. For instance, when the destination server 104 receives the user-agent/cipher suite pairing from the user client 102, the destination server 104 may utilize the network security component to determine whether the user-agent/cipher suite pairing is a legitimate pairing. The user-agent database 108 may also be incorporated within the destination server 104, such that the destination server 104 may utilize the network security component to determine the confidence score for each user-agent/cipher suite pairing based at least in part on a request log specifying the various user client 102 requests received over a particular period of time.

Figure 2:
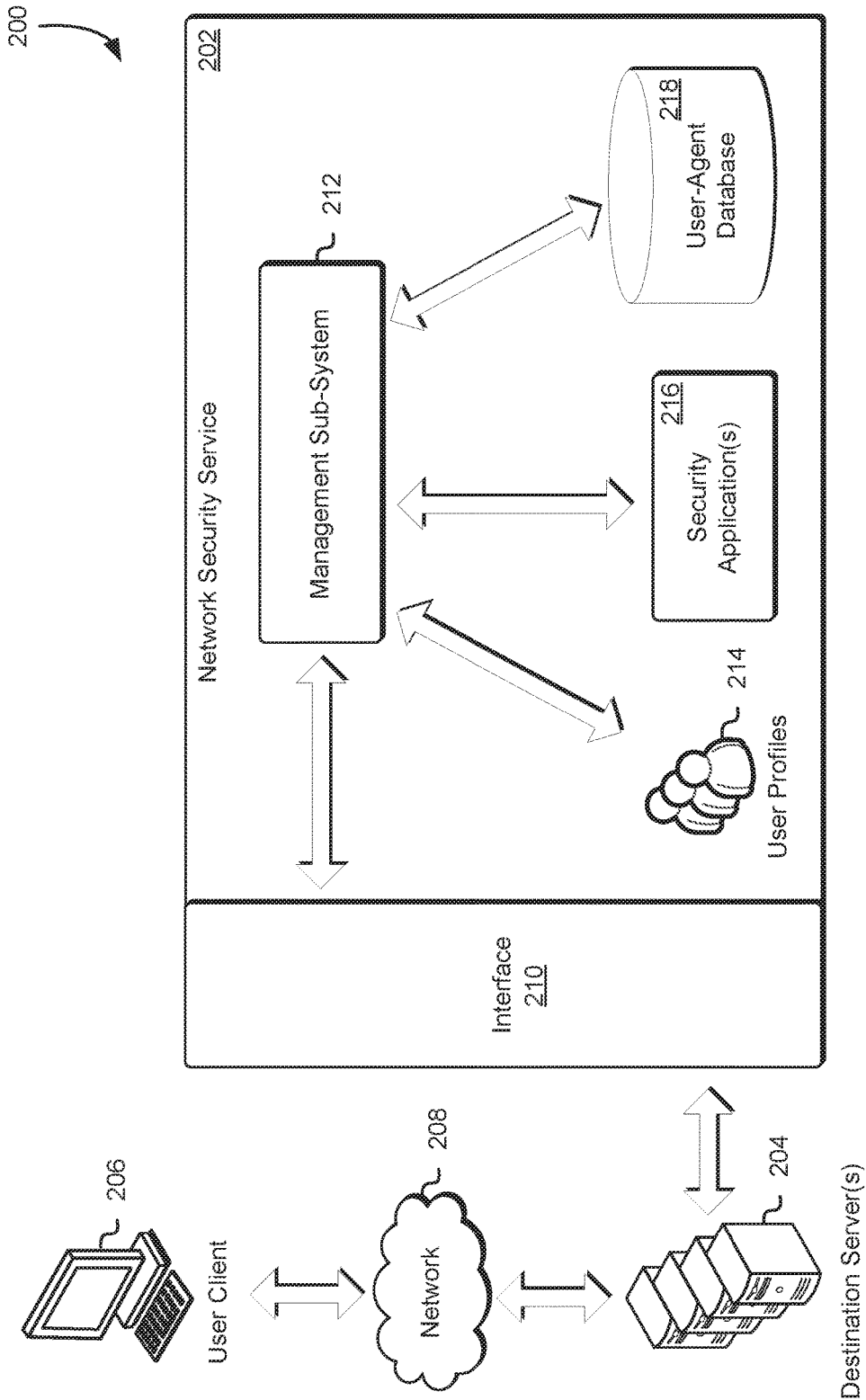
FIG. 2 shows an illustrative example of an environment in which a destination server utilizes a network security service comprising various components to evaluate the authenticity of a user-agent header provider by a user client in accordance with at least one embodiment.

As noted above, a destination server receiving an application layer request, such as a HTTPS request, from a user client may utilize a network security service to determine whether the authenticity of the one or more applications utilized to access the destination server. For instance, the HTTPS request may include a user-agent field specifying the one or more applications being utilized by the user client to access the destination server and one or more corresponding cipher suites, which may be utilized by the destination server to communicate with the user client through the secure communications channel that is to be established in response to the HTTPS request. Accordingly, FIG. 2 shows an illustrative example of an environment 200 in which a destination server 204 utilizes a network security service 202 comprising various components to evaluate the authenticity of a user-agent header provider by a user client 206 in accordance with at least one embodiment.

The destination server 204 may be configured to provide accessibility to certain content to various users over a communications network 208, such as the Internet. For instance, the destination server 204 may be a web server, which may be configured to provide various web pages to users through a browser application or other suitable application. Alternatively, the destination server 204 may be a file server, wherein a user may access the destination server 204 to obtain any files provided by the destination server 204. To access the destination server 204, a user client 206 may submit a HTTPS request through the communications network 208 to the destination server 204 to establish a secure communications channel for transmitting encrypted data. The HTTPS request may include a user-agent header specifying the one or more applications utilized by the user of the user client 206 to access the destination server 204. For instance, if the user of the user client 206 has utilized a browser application (e.g., Chrome®, etc.) to access the destination server 204, the user-agent header may specify this particular browser application.

In addition to the user-agent header, the HTTPS request may further specify one or more cipher suites, which may be used by the destination server 204 to determine which cryptographic process is to be used to communicate with the user client 206 over the secure communications channel. The specified one or more cipher suites may be specific to the particular browser application specified within the user-agent header provided by the user client 206. The destination server 204 may select a cipher suite from the specified one or more cipher suites to perform the TLS/SSL handshake for the secure communications channel. However, prior to doing so, the destination server 204 may communicate with a network security service 202, such as through one or more application programming interface (API) calls to the service, to request analysis of the provided user-agent header and the corresponding one or more cipher suites from the user client 206.

The network security service 202 may include an interface 210, which may enable the destination server 204, administrators of the destination server 204 and other users to access the network security service 202. For instance, the interface 210 may include a graphical user interface (GUI) which may enable an administrator of the destination server 204 to provide the network security service 202 with the user-agent header and corresponding one or more cipher suites that the administrator would like to have analyzed. Alternatively, the destination server 204 may be configured to utilize the interface 210 through one or more automated processes to provide the received user-agent header and corresponding one or more cipher suites to the network security service 202.

The network security service 202 may include a management sub-system 212, which may be configured to receive the user-agent header and corresponding one or more cipher suites from the interface 210 and analyze the user-agent/cipher suite pairing to determine whether the user-agent is authentic. For instance, the management sub-system 212 may access a user-agent database 218 to identify a user-agent entry corresponding to the provided user-agent header. The user-agent database 218 may include an entry for each known user-agent header received by the network security service 202, either through the destination server 204 or through other analytical means (e.g., offline testing of various browser applications in a controlled environment, etc.). Additionally, for each user-agent entry, the user-agent database 218 may specify one or more corresponding cipher suites.

In an embodiment, the user-agent database 218 specifies a confidence score for each user-agent/cipher suite pairing based at least in part on the population of a group that includes the user-agent/cipher suite pairing. For example, the network security service 202 may be configured to review an HTTPS request log specifying user-agent/cipher suite pairings received over a particular period of time. The network security service 202 may group these user-agent/cipher suite pairings and count each incidence of a pairing within the group. A higher confidence score may be assigned to a particular group with a greater incidence of user-agent/ cipher suite pairings over the particular period of time. Alternatively, if the particular group does not have a high incidence rate, the group may receive a lower confidence score and may result in security measures being performed if such a user-agent/cipher suite pairing is received.

Once the management sub-system 212 has identified the user-agent/cipher suite pairing within the user-agent database 218, the management sub-system 212 may determine whether the user client 206 should be flagged and security measures taken to address a potentially forged user-agent header. For instance, the management sub-system 212 may be configured to flag a user client 206 in the event that the confidence score for the user-agent/cipher suite pairing is below a certain threshold or cannot be found within the user-agent database 218. In such instances, the management sub-system 212 may access a user profile data store 214 to flag the user profile associated with the user client 206 such that future communications from the user client 206 may trigger a security response (e.g., denial of request, termination of connection with the user client 206, etc.). Additionally, the management sub-system 212 may select one or more security applications 216 that may be provided to the destination server 204 to perform additional security measures resulting from the user client 206 being flagged.

The destination server 204 may receive the one or more security applications 216 from the network security service 202 as well as an indication that the user client 206 has been flagged if the user-agent/cipher suite pairing provided by the user client 206 does not have a sufficiently high confidence score or could not be identified within the user-agent database 218. The destination server 204 may implement these security applications 216 into the communications with the user client 206. For instance, the destination server 204 may transmit a web page that includes one or more CAPTCHA challenges. These CAPTCHA challenges may require user input, preventing the use of bots or other automated processes to circumvent these challenges. Thus, if an automated process was utilized to provide the user-agent header and corresponding cipher suites, the automated process would be unable to fulfill these CAPTCHA challenges.

If the user client 206 is unable to fulfill the requirements of these one or more security applications implemented by the destination server 204, the destination server 204 may implement additional security measures to hinder or disable the user client's 206 ability to communicate with the destination server 204. For instance, if the user client 206 is unable to fulfill the requirements of the one or more security applications, the destination server 204 may terminate the connection to the user client 206. Alternatively, the destination server 204 may generate a quarantined communications session with the user client 206 such that the user client 206 may continue data transmissions as usual. However, the destination server 204 may not provide any substantive data to the user client 206 through this quarantined communications session but rather may continue to obtain information about the user client 206. This may enable the destination server 204 to observe the user client 206 and garner any additional information that may be used to enhance the security measures that are implemented and improve detection of any forged user-agent headers.

If the user-agent/cipher suite pairing provided by the user client 206 is found to be legitimate by the network security service 202, the destination server 204 may establish the secure communications channel and continue network communications through this channel. In an embodiment, the management sub-system 212 of the network security service 202 transmits one or more executable instructions to the destination server 204 to initiate a new TLS/SSL handshake procedure for the secure communications channel. Additionally, the network security service 202 may cause the destination server 204 to exclude any cipher suites previously provided to the destination server 204 by the user client 206. Thus, the destination server 204 may cause the user client 206 to select an alternative cipher suite, thereby triggering an analysis of a new user-agent/cipher suite pairing. This may result in the discovery of a forged user-agent as less common user-agent/cipher suite pairings may be provided to the network security service 202 resulting in the user client 206 being flagged.

Figure 3:
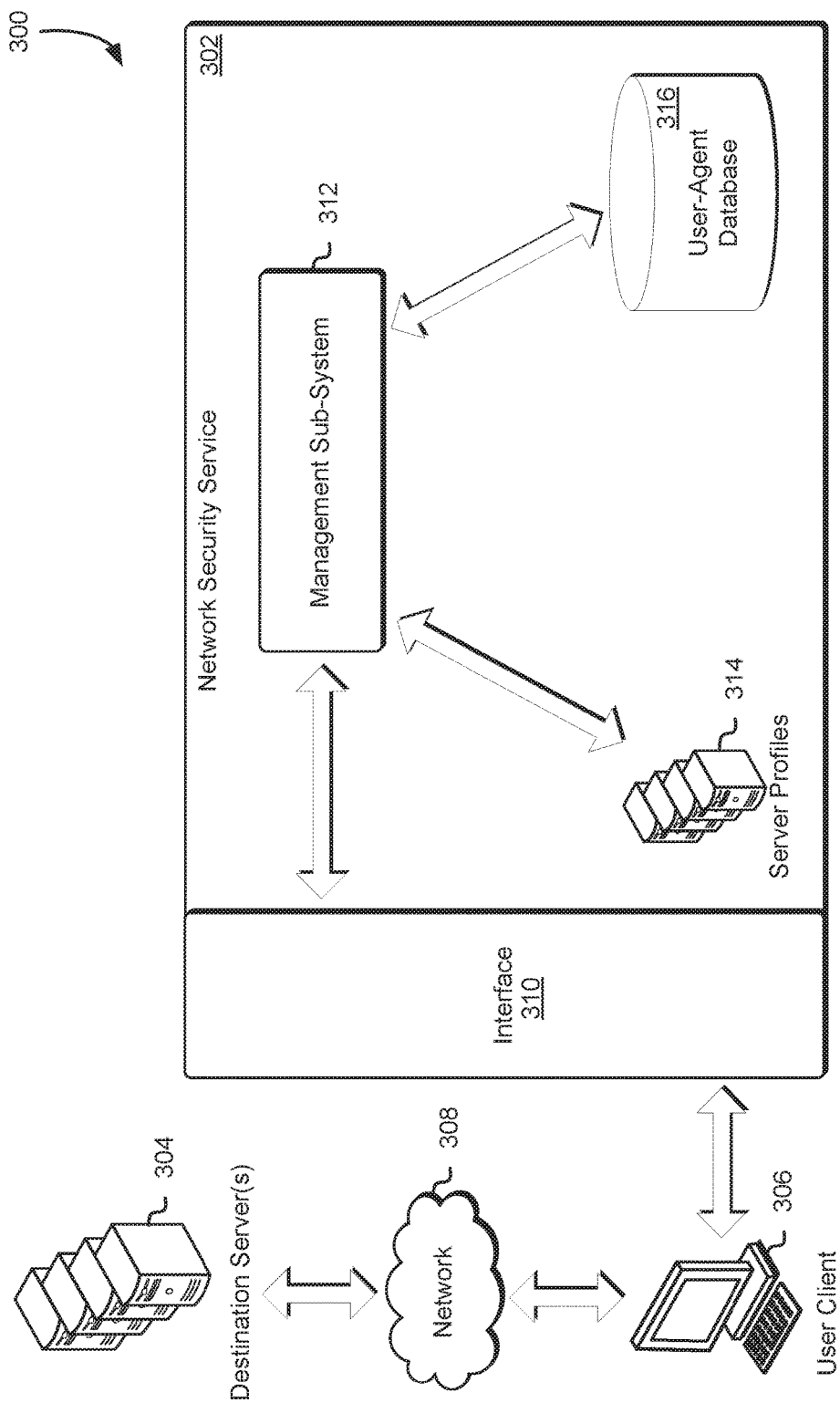
FIG. 3 shows an illustrative example of an environment in which a user client utilizes a network security service comprising various components to evaluate the authenticity of a user-agent header provided by a destination server in accordance with at least one embodiment.

As noted above, the network security service may be available to customers of a service provider, which may provide the network security service to its customers as an ancillary service to other services utilized by these customers. Accordingly, FIG. 3 shows an illustrative example of an environment 300 in which a user client 306 utilizes a network security service 302 comprising various components to evaluate the authenticity of a user-agent header provided by a destination server 304 in accordance with at least one embodiment. As described above in connection with FIG. 2, a user client 306 may transmit a HTTPS request to a destination server 304 to establish a secure communications channel, such as a TLS/SSL secure channel. This secure communications channel may be used through a communications network 308, such as the Internet. As part of the TLS/SSL secure channel handshake process, the user client 306 may receive a user-agent header and corresponding one or more cipher suites from the destination server 304 or another system reporting a user-agent and corresponding one or more cipher suites, which may be used by the user client 306 to communicate with the destination server 304 through the secure communications channel.

When the user client 306 receives the user-agent header and corresponding one or more cipher suites from the destination server 304, the user client 306 may communicate with the network security service 302, such as through one or more API calls to the service, to request analysis of the received user-agent header and corresponding one or more cipher suites.

The network security service 302 illustrated in FIG. 3 may be similar to the network security service described above in connection with FIG. 2. For instance, the network security service 302 may include an interface 310, which a user of the user client 306 may utilize to submit the request to analyze the received user-agent header and corresponding cipher suites from the destination server 304. For instance, the interface 310 may include a GUI, which a user of the user client 306 may utilize to request analysis of the received user-agent and corresponding one or more cipher suites. Alternatively, the interface 310 may be configured to display, on the user client 306, the status of any analysis being performed on behalf of the user client 306. For instance, when the user client 306 receives the user-agent header and corresponding one or more cipher suites from the destination server 304, the user client 306 may transmit the user-agent header and corresponding one or more cipher suites to the network security service 302 without user input. The interface 310 may thus provide the user of the user client 306 with a status report of any current or previously performed analyses and the results of any completed analyses.

The network security service 302, similar to the network security service described above in connection with FIG. 2, may include a management sub-system 312, which may be configured to receive the user-agent header and corresponding one or more cipher suites from the interface 310 and analyze the user-agent/cipher suite pairing to determine whether the user-agent header provided by the destination server 304 is authentic. For instance, the management sub-system 312 may access a user-agent database 316 to identify a user-agent entry corresponding to the provided user-agent header. Additionally, for each user-agent entry, the user-agent database 316 may specify one or more corresponding cipher suites. The user-agent database 316 may further specify, for each user-agent/cipher suite pairing, a confidence score which may be indicative as to whether the user-agent/cipher suite pairing may be trusted or whether additional precautions are to be taken upon detection of the particular user-agent/cipher suite pairing.

If the confidence score for the provided user-agent/cipher suite pairing is below a certain threshold, as defined by an administrator of the network security service 302, the management sub-system 312 may flag the destination server 304 and access a server profile data store 314 to flag the destination server profile associated with the destination server 304 such that future communications from the destination server 304 may trigger a security response (e.g., denial of request, termination of the connection, etc.). Additionally, the management sub-system 312 may transmit a notification to the user client 306 specifying that the destination server 304 has been flagged by the network security service 302. Further the management sub-system 312 may provide to the user of the user client 306, through the interface 310, one or more recommendations for security measures that may be taken to address the detection of a potentially forged user-agent header from the destination server 304. This may enable the user client 306 to terminate the connection to the destination server 304 or perform other security measures to prevent any data within the user client 306 from being compromised.

It should be noted that the network security service 302 (as well as the similar network security service described above in connection with FIG. 2) may be accessible by the user client 306, the destination server 304 or any other system. For instance, as the destination server 304 and the user client 306 perform the TLS/SSL handshake process and exchange user-agent and corresponding cipher suite information, the destination server 304 and user client 306 may both access the network security service 302 to determine whether any of the provided user-agent headers have been forged or manipulated. For instance, if either the user client 306 or destination server 304 has been compromised resulting in delivery of forged user-agent headers, the other entity may be able to take appropriate security measures to isolate the compromised entity and prevent dissemination of information to the compromised entity.

Figure 4:
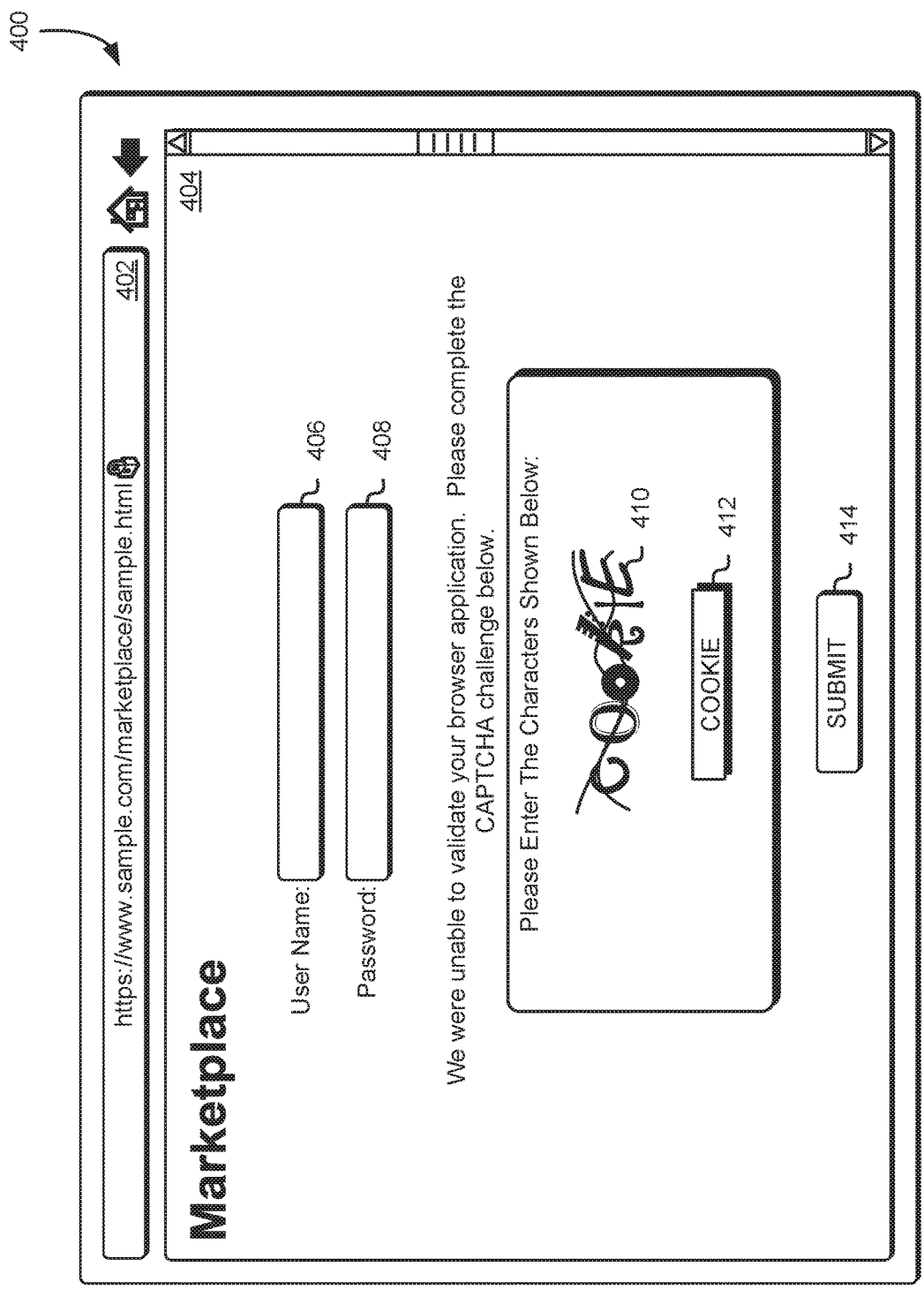
FIG. 4 shows an illustrative example of a browser application that includes a presentation of one or more security features resulting from an invalid user-agent and corresponding negotiable features in accordance with at least one embodiment.

As noted above, if the network security service detects, through use of the user-agent database, that a confidence score for a particular user-agent/cipher suite pairing is below a certain threshold or that the particular user-agent/cipher suite is not specified within the user-agent database, the network security service may flag the user client and enable the destination server to perform one or more security measures through use of one or more security applications. For instance, in an embodiment, the destination server may utilize a security application to inject a security challenge into a web page, which may be presented to the user client through a browser application installed on the user client. In order to pass the security challenge, user input may be required, thus preventing bots or other automated processes from gaining access to the destination server. Accordingly, FIG. 4 shows an illustrative example of a browser application 400 that includes a presentation of one or more security features resulting from an invalid user-agent and corresponding negotiable features in accordance with at least one embodiment. The browser application 400 may be installed on a user client, such that a user of the user client may utilize the browser application 400 to access data over a communications network and provided to the user client by the destination server. Additionally, the user of the user client may utilize the browser application 400 to submit one or more HTTPS requests to establish a secure communications channel for transmitting encrypted data.

The browser application 400 may include several elements that may be utilized by a user to transmit a HTTPS request to a destination server and interact with the destination server as required. For instance, the browser application 400 may include an address bar 402, which may enable a user of the user client to enter the uniform resource locator (URL) for a particular resource made available by a destination server. The URL may include a scheme name, which may be used to specify what kind of resources are to be accessed. For instance, if a URL includes a HTTPS scheme name, this may specify that the user would like to establish an HTTPS connection that is to be secured using TLS/SSL protocols. The URL may also include a domain name, which one or more domain name service (DNS) servers may translate into an Internet Protocol (IP) address. This IP address may be used to identify the destination server that includes the data that the user of the user client is seeking.

The browser application 400 may further include a document window 404, which may be used to display data provided by the destination server in response to the user request to establish a secure communications channel. For instance, as illustrated in FIG. 4, the user of the user client has requested access to an online marketplace provided through the destination server. In order to access the online marketplace, however, the user may be required to provide his/her credentials. For instance, the destination server may cause the document window 404 to display a user name input field 406 and a corresponding password input field 408 to enable the user to provide his/her credentials to the destination server.

As noted above, when the user client submits a HTTPS request to establish a secure communications channel, the user client may transmit to the destination server a user-agent header and corresponding one or more negotiable features (e.g., cipher suites), which the destination server may utilize to communicate with the user client over the secure communications channel. When the user utilizes the address bar 402 to submit this HTTPS request, the browser application 400 may transmit its specific user-agent header and corresponding one or more cipher suites to the destination server. This may enable the destination server to verify that the user-agent header has not been forged. For instance, the destination server may transmit the received user-agent header and corresponding one or more cipher suites to a network security service, which may be configured to analyze user-agent/cipher suite pairings to determine whether a user-agent header has been forged or otherwise manipulated.

If the network security service determines, based at least in part on an analysis of the received user-agent header and corresponding one or more cipher suites that the user-agent header has either been forged or manipulated, the network security service may select one or more security applications that may be provided to the destination server to perform one or more security measures. For instance, as noted above, the network security service may assign a confidence to the user-agent/cipher suite pairing, such that if the score is below a certain threshold, certain security measures may be taken. For example, if the user-agent/cipher suite pairing is specified within the user-agent database of the network security service but has a confidence score below a certain threshold, the network security service may select one or more security applications that may be provided to the destination server for implementation into the web page document provided to the browser application 400 for display in the document window 404. In an alternative example, if the user-agent/cipher suite pairing is not specified within the user-agent database, the network security service may transmit executable instructions to the destination server that may cause the destination server to terminate the connection with the user client.

As illustrated in FIG. 4, the destination server, through the network security service, was unable to verify the authenticity of the user-agent header provided by the browser application 400. For instance, the user-agent/cipher suite pairing provided by the browser application 400 did not satisfy the confidence score threshold described above, causing the network security service to provide the destination server with one or more security applications for implementation in the web page document transmitted to the browser application 400 and displayed in the document window 404. For example, as illustrated in FIG. 4, the destination server has integrated a CAPTCHA challenge into the web page document. In order to continue communications with the destination server, a user of the browser application 400 may be required to complete the CAPTCHA challenge successfully. The CAPTCHA challenge may include one or more components. For instance, the CAPTCHA challenge may include the CAPTCHA text field 410, which may include distorted text that is only readable by a human, thus preventing bots or other automated processes from being able to successfully complete the challenge. Further, the CAPTCHA challenge may include a CAPTCHA input field 412, which may enable the user to specify what the contents of the CAPTCHA text field 410 are. While CAPTCHAs are used extensively throughout the present disclosure for the purpose of illustration, additional and/or alternative security measures may be implemented. For instance, in some embodiments, the destination server may notify the user through the browser application 400 that the browser application 400 could not be validated, requiring the user to select an alternative browser application or address any issues inherent in the current browser application 400 in order to proceed.

As noted above, the network security service may include a user-agent database, which may specify one or more known user-agent/cipher suite pairings and confidence scores for each of these pairings. The network security service may utilize these confidence scores to determine whether the user-agent/cipher suite pairing may be trusted or whether additional precautions are to be taken upon detection of the particular user-agent/cipher suite pairing. Accordingly, FIG. 5 shows an illustrative example of a user-agent database 500 specifying one or more entries for each user-agent header analyzed by the network security service. When the network security service accesses the user-agent database 500 to determine the authenticity of a user-agent/cipher suite pairing, the network security service may attempt to identify a user-agent entry within a user-agent header column 502 for the particular user-agent/cipher suite pairing. The user-agent header column 502 may specify one or more user-agent headers observed by the network security service over a particular period of time. For instance, in an embodiment, the network security service obtains a request log from a destination server and identifies the one or more user-agent headers specified therein. These user-agent headers may be added to the user-agent database 500 through the user-agent header column 502.

The user-agent database 500 may further include a known negotiable features column 504, which may be used to specify one or more known negotiable features for each user-agent header specified within the user-agent header column 502. In order to populate the known negotiable features column 504 for each user-agent header, the network security service may utilize the one or more request logs from the destination server to identify each user-agent/cipher suite pairing observed over a particular period of time. As each pairing is identified, the network security service may populate the known negotiable features column 504 for each user-agent header specified within the one or more request log. While each user-agent header specified within FIG. 5 has three corresponding known negotiable features specified within the known negotiable features column 504, it should be noted that the number of negotiable features that may be specified for each user-agent header may vary. For instance, a popular user-agent header may correspond to more known negotiable features than less popular user-agent headers.

For each user-agent/cipher suite pairing, the network security service may track each observed instance of the pairing in order to determine a confidence score. This confidence score may be used to determine whether a particular user-agent header provided by a user client is authentic or not. For instance, the network security service may access the one or more request logs from the destination server and, for each user-agent/cipher suite pairing group, track each instance specified within the one or more request logs. This information may be used to populate an observed instances column 506 within the user-agent database 500. The observed instances column 506 may include a tally for each time a user-agent/cipher suite pairing is observed within one or more request logs. The tally may be cumulative over the entire analytical period in which the network security service has reviewed request logs from the destination server or may correspond to the number of observed instances over a particular period of time.

Once the network security service has determined the number of observed instances for each user-agent/cipher suite pairing, the network security service may determine a confidence score for each user-agent/cipher suite pairing. For instance, in some embodiments, a higher confidence score may be assigned to a user-agent/cipher suite pairing that has been observed a substantial amount of times over a particular period. Alternatively, a lower score may be assigned to a user-agent/cipher suite pairing that has not been observed frequently over a particular period of time or whose frequency is low. This confidence score may be specified within a confidence score column 508 within the user-agent database 500. This may enable the network security service to identify, for any observed user-agent/cipher suite entry a confidence score, which may be used to determine whether the user-agent header provided by the user client is authentic. While the confidence score column 508 utilizes an alphabetical grading scale as the basis for the confidence score for the purpose of illustration, other grading scales may be utilized. For instance, the confidence score may be recorded using a percentage score (e.g., higher percentage corresponds to higher confidence user-agent is authentic), color table or any other grading scale. It should also be noted that the user-agent database 500 may include additional or alternative entries as needed. For instance, in some embodiments, the user-agent database 500 may include an origin column, which may be used to specify the country of origin for the received user-agent/cipher suite pairing. This column may be utilized to calculate the confidence score (e.g., communications from known rogue states may reduce the score, etc.).

Figure 6:
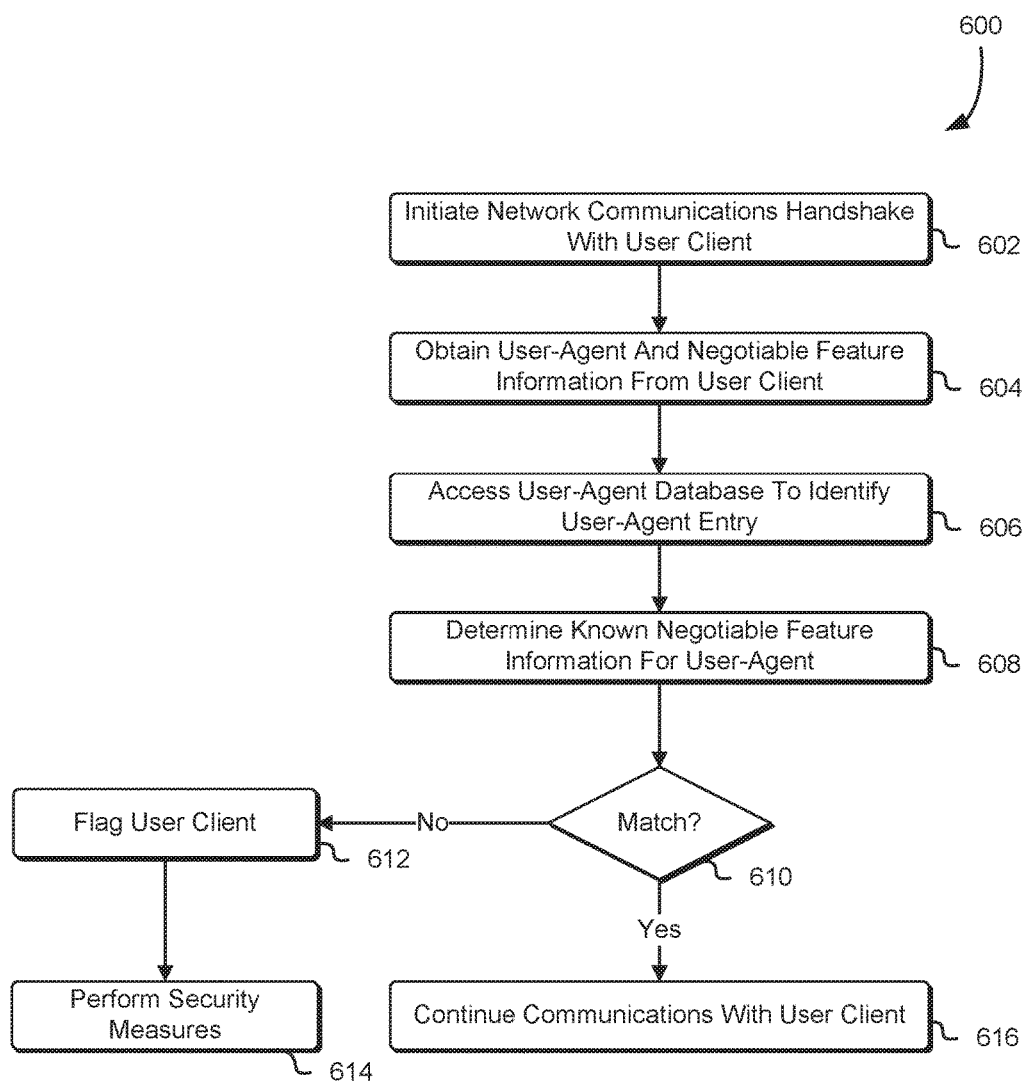
FIG. 6 shows an illustrative example of a process for verifying a user-agent and corresponding negotiable features to determine the authenticity of the user-agent in accordance with at least on embodiment.

As noted above, a destination server may include a network security component, which may be configured to receive a user-agent header and corresponding one or more cipher suites from a user client. The network security component of the destination server may determine whether the user client that submitted the user-agent header and corresponding one or more cipher suites may be trusted. Accordingly, FIG. 6 shows an illustrative example of a process 600 for verifying a user-agent and corresponding negotiable features to determine the authenticity of the user-agent in accordance with at least on embodiment. The process 600 may be performed by the aforementioned network security component of the destination server, which may be configured to communicate with one or more user clients to receive user-agent/cipher suite pairings for analysis. Further, the network security component may be configured to cause the destination server to perform one or more security measures in the event that the provided user-agent header has been deemed to be forged or manipulated. It should be noted that in some embodiments, the network security component may also be incorporated in a user client such that the network security component may analyze user-agent/cipher suite pairings obtained from one or more destination servers.

When a user client submits, via a browser application, a HTTPS request to establish a secure communications channel with a destination server, the destination server may initiate 602 a network communications handshake with the user client. For instance, when the user client specifies, through the HTTPS request, that communications between the user client and the destination server should be performed through a secure communications channel, the destination server may respond by initiating a TLS/SSL channel handshake procedure and receive information from the user client necessary to authenticate the user client. For example, for TLS/SSL channels, the user client may transmit along with the HTTPS request a user-agent header and corresponding one or more cipher suites, which the destination server may utilize to communicate with the user client through the secure channel that is to be established. Thus, the network security component, through the destination server, may obtain 604 user-agent and cipher suite information from the user client.

Once the network security component has obtained the user-agent header and corresponding cipher suite from the user client, the network security component may access 606 a user-agent database to identify a user-agent entry corresponding to the provider user-agent header. The user-agent database may specify one or more entries for each known user-agent header analyzed by the network security component. For instance, the destination server may record, within a request log, each user-agent/cipher suite pairing received within a HTTPS request from one or more user clients over a particular period of time. The network security component may utilize this request log to update the user-agent database by creating an entry for each new user-agent header discovered, as well as specifying each cipher suite corresponding to the user-agent headers received. As will be described in greater detail below in connection with FIG. 8, the network security component may also assign a confidence score to each user-agent/cipher suite pairing specified within the user-agent database based at least in part on the number of times the user-agent/cipher suite pairing was observed over a period of time. For instance, a higher confidence score may be assigned to a user-agent/cipher suite pairing if the pairing was observed a significant number of times over other pairings.

If the network security component is able to identify a user-agent entry for the received user-agent header, the network security component may determine 608 any known cipher suites that may correspond to the particular user-agent header. As noted above, the user-agent database may specify, for each user-agent entry, one or more cipher suites that have been observed over time by the network security component, either through analysis of one or more request logs or internal experimentation with various browser applications and other applications (e.g., offline analysis using known applications and tools). Thus, the network security component may be able to determine 610 whether there is a matching user-agent/cipher suite pairing specified within the user-agent database.

If the user-agent database does not specify the provided user-agent/cipher suite pairing, this may be indicative of a potentially forged or manipulated user-agent header. Thus, in some embodiments, the network security component may flag 612 the particular user client as having been potentially compromised or attempting to improperly obtain access to data from the destination server. The network security component may access a user profile data store and, within the user profile associated with the particular user client, specify that the user client may be suspect. Further, the network security component may cause the destination server to perform 514 one or more security measures in response to the user client being flagged. For instance, in some embodiments, the destination server may limit the data accessible to the user client and prevent access to more sensitive information or administrative controls. In other embodiments, the network security component may cause the destination server to complete the network communications handshake and allow communications from the user client until the user is notified that the connection should be terminated.

In an embodiment, the network security component will enable network communications through the secure communications channel but require additional authentication from the user client. For instance, the network security component may require, from the user of the user client, a password entry, one or more security question answers or other credentials in order to verify that the user should be granted access to the destination server. Additionally, or alternatively, the network security component may cause the destination server to transmit a code or other credential to an alternative user device, which may need to be entered into a security input field within a web page provided to the user client to verify the user's identity. In an alternative embodiment, the network security component causes the destination server to terminate the connection to the user client. It should be noted that the security measures described above are illustrative and should not be construed as being an exhaustive listing of possible security measures that may be performed.

If the received user-agent/cipher suite pairing received from the user client does match an existing entry within the user-agent database, the network security component may enable the destination server to continue 516 network communications with the user client. As will be described in greater detail in connection with FIG. 9, the network security component may further cause the destination server to initiate a new network communications handshake at a later time to ensure the authenticity of the user-agent provided by the user client. For instance, the network security component may cause the destination server to exclude the one or more previous cipher suites provided to the destination server, forcing the user client to select a new cipher suite corresponding to the user-agent header. This may enable the network security component to continue evaluating the user client to ensure that the user-agent header has not been forged or otherwise manipulated.

Figure 7:
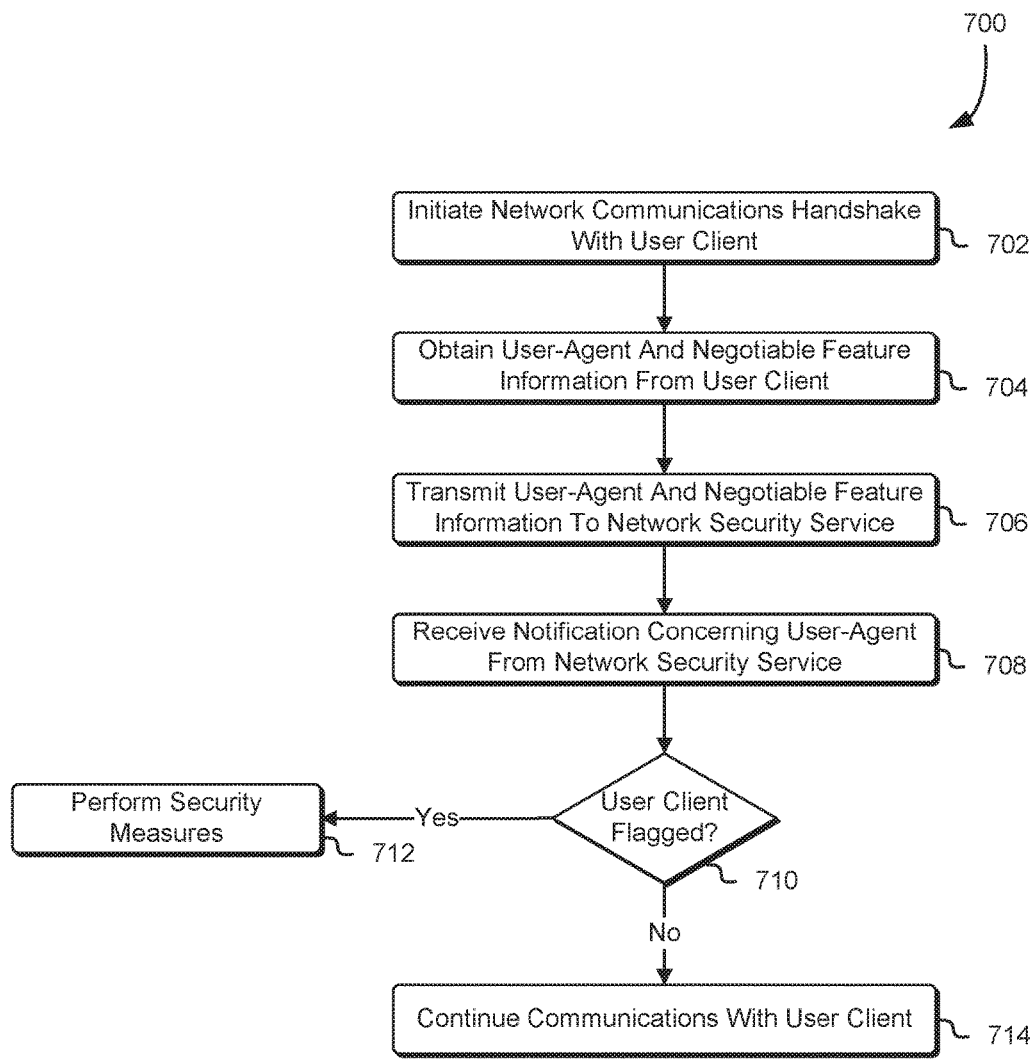
FIG. 7 shows an illustrative example of a process for utilizing a network security service for verifying a user-agent and corresponding negotiable features to determine the authenticity of the user-agent in accordance with at least one embodiment.

As noted above, a destination server may communicate with a network security service to determine whether a user-agent/cipher suite pairing received from a user client is authentic, thereby demonstrating that the user-agent header has not been forged or manipulated. Accordingly, FIG. 7 shows an illustrative example of a process 700 for utilizing a network security service for verifying a user-agent and corresponding negotiable features to determine the authenticity of the user-agent in accordance with at least one embodiment. The process 700 may be performed by the aforementioned destination server, which may be configured to access a network security service to verify one or more received user-agent/cipher suite pairings. Further, the destination server may be configured to perform one or more security measures in the event that the user-agent/cipher suite pairing is found to be invalid or has been assigned a confidence score below a certain threshold value. It should be noted that in some embodiments, the process 700 may be performed by a user client that may configured to access the network security service to verify a user-agent/cipher suite pairing received from a destination server.

Similar to the process illustrated above in FIG. 6, the destination server may initiate 702 a network communications handshake with a user client and obtain 704, from this user client, a user-agent header and corresponding one or more cipher suites. Once the destination server receives the user-agent header and corresponding one or more cipher suites from the user client, the destination server may transmit 706 the user-agent header and corresponding one or more cipher suites to the network security service for analysis. As noted above, the network security service may include an interface, which may enable the destination server to communicate with the network security service and specify which user-agent/cipher suite pairing is to be analyzed.

As noted above, when the network security service receives a user-agent/cipher suite pairing from a destination server, the network security service may access a user-agent database to determine whether the provided user-agent/cipher suite pairing matches an existing user-agent/cipher suite entry within the user-agent database. Further, if there is a match, the network security service may obtain a confidence score for the user-agent/cipher suite pairing, which may be used to determine whether the user client is to be flagged or communications are to be permitted between the destination server and the user client. For instance, if the confidence score for the provided user-agent/cipher suite pairing is below a certain threshold value or the user-agent/cipher suite pairing is not specified within the user-agent database, the network security service may flag the particular user client and transmit one or more executable instructions to the destination server to perform one or more security measures.

In an embodiment, the network security service notifies the destination server if a user client has been flagged as a result of a user-agent/cipher suite pairing either not being found within the user-agent database or the user-agent/ cipher suite pairing has been assigned a confidence score below a certain threshold. Thus, the destination server may determine 610 whether the user client has been flagged. If the user client has been flagged, the destination server may perform 612 one or more security measures to address any potential issues with the user client. For instance, the destination server may terminate the connection between the user client and the destination server. In another instance, the destination server may isolate the user client such that only limited data is provided to the user client through the secure communications channel, preventing the user client from accessing more sensitive data, such as administrative information and account information. The security measures described above are not exhaustive and other security measures may be performed dependent on certain criteria (e.g., actual confidence score, etc.).

If the user client has not been flagged, the destination server may establish the secure communications channel and continue 614 communications with the user. Additionally, the destination server may, at any time, initiate a new network communications handshake and exclude any previously provided cipher suites in order to force the user client to specify a new cipher suite for the particular user-agent header. This may enable the destination server to continue receiving data from the user client and determine whether the user-agent header has been forged or manipulated.

Figure 8:
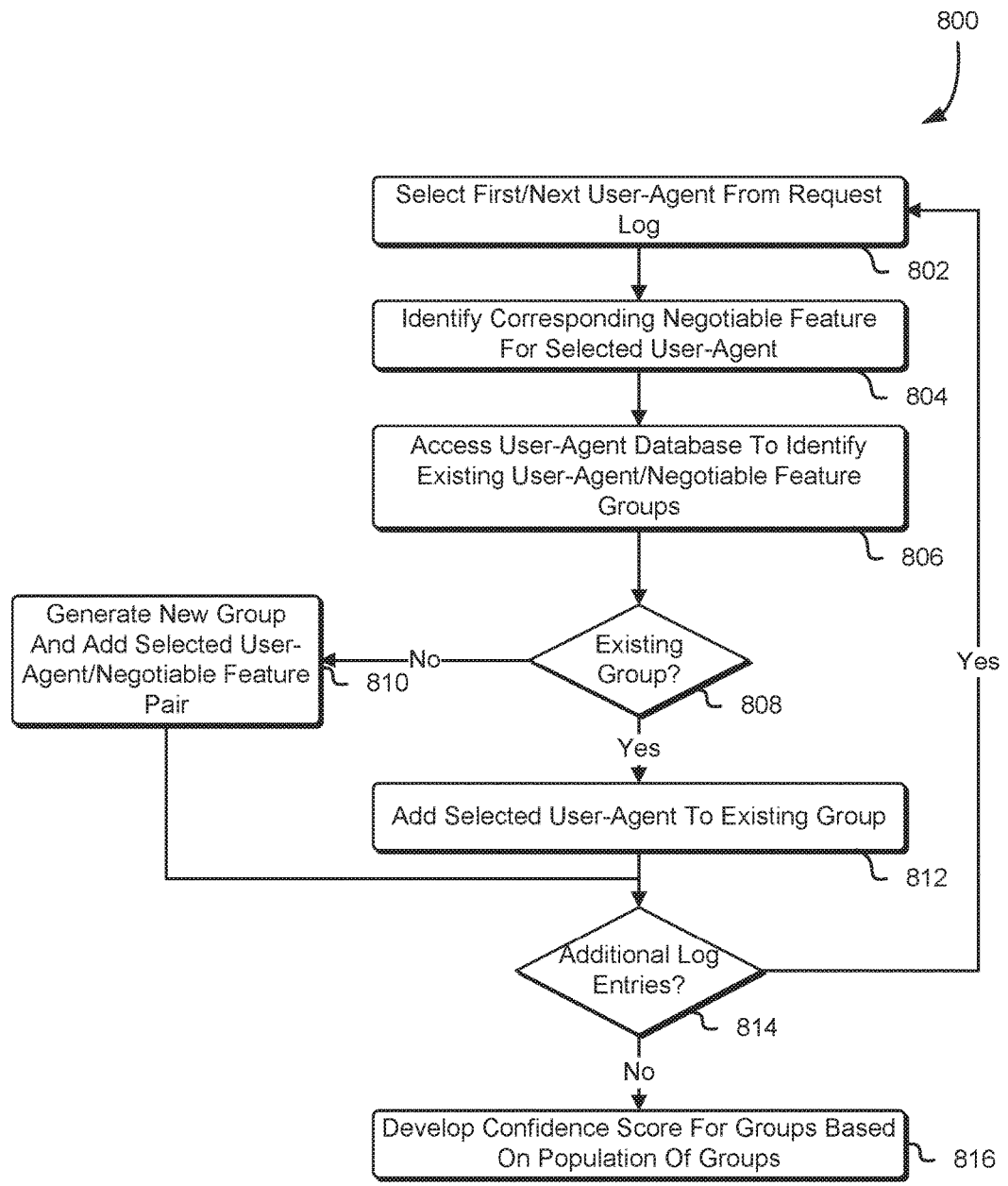
FIG. 8 shows an illustrative example of a process for utilizing a log specifying user-agent and corresponding negotiable features to develop a confidence score for groups of user-agent and negotiable feature pairings in accordance with at least one embodiment.

As noted above, the network security service or network security component of the destination server/user client may be configured to develop, for each user-agent/cipher suite pairing, a confidence score which may be used to determine whether the provider of the user-agent header is to be flagged and security measures taken. For instance, if the user-agent/cipher suite pairing has been assigned a confidence score below a certain threshold value, the provider of the user-agent header (e.g., user client or destination header) may be flagged and the network security service or network security component may cause the recipient of the user-agent header to perform one or more security measures. Accordingly, FIG. 8 shows an illustrative example of a process 800 for utilizing a log specifying user-agent and corresponding negotiable feature pairings to develop a confidence score for groups of pairings in accordance with at least one embodiment. The process 800 may be performed by the aforementioned network security service or network security component, which may be configured to utilize a request log to identify received user-agent/cipher suite pairings and, based at least in part on the recurrence of these pairings over a particular period of time, develop a confidence score for each pairing.

When a destination server receives one or more user-agent/cipher suite pairings from one or more user clients within a HTTPS request, the destination server may track these pairings within a request log. The request log may thus specify the received one or more user-agent/cipher suite pairings received over a particular period of time (e.g., five minutes, ten minutes, an hour, etc.). This request log may be provided to the network security service or network security component after the particular period of time has passed and the request log has been closed. Thus, once the request log has been obtained, the network security service or component may select 802 a first user-agent from the request log and identify 804, for the selected user-agent, a corresponding cipher suite.

Once the network security service or network security component has identified the user-agent/cipher suite pairing from the request log, the service or component may access 806 a user-agent database to identify any existing user-agent/cipher suite groups that include the user-agent/cipher suite pairing. Each user-agent/cipher suite group may include a tally of the number of instances in which the particular user-agent/cipher suite pairing has been previously observed by the one or more destination servers, as well as the frequency in which these observations have been made. Thus, the network security service or network security component may determine 808 whether there is an existing group that includes the selected user-agent/cipher suite pairing.

If the user-agent database does not include an existing group for the selected user-agent/cipher suite pairing, the network security service or component may generate 810 a new group and add the selected user-agent/cipher suite pairing to the group. Additionally, the network security service or component may specify, within the group, the tally for this particular user-agent/cipher suite pairing. Thus, the network security service or component may be able to track any new instances of the particular user-agent/cipher suite upon further request log reviews. Alternatively, if the user-agent database does include an existing group for the selected user-agent/cipher suite pairing, the network security service or component may add 812 the selected user-agent to the existing group by incrementing the tally for the group and updating the frequency calculation value to include the incidence of this user-agent/cipher suite pairing.

Once the network security service or component has either added the user-agent/cipher suite pairing to an existing group or to a newly generated group within the user-agent database, the service or component may determine 814 whether there are additional log entries within the request log that need to be analyzed and recorded within the user-agent database. If the request log includes additional log entries, the network security service or component may select 802 the next user-agent header from the request log and identify the corresponding cipher suite for the selected user-agent header. It should be noted that in some embodiments there may be more than one cipher suite observed for each unique user-agent header entry within the request log. Thus, in such embodiments, the network security service or component may select each user-agent entry/cipher suite pairing specified within the request log.

If the network security service or component has analyzed each user-agent/cipher suite pairing specified within the request log and updated the one or more groups within the user-agent database to reflect the commonality of each user-agent/cipher suite pairing, the network security service or component may develop 816 a confidence score for each group based at least in part on the population (e.g., tally of observed instances) of the group and/or the frequency in which each user-agent/cipher suite group has been observed. For instance, the network security service or component may calculate the confidence score for a particular user-agent/cipher suite group based at least in part on the observed instances of the group within the request log over a period of time compared to all observed instances for all groups. The confidence score may be recorded within the user-agent database for each user-agent entry.

Figure 9:
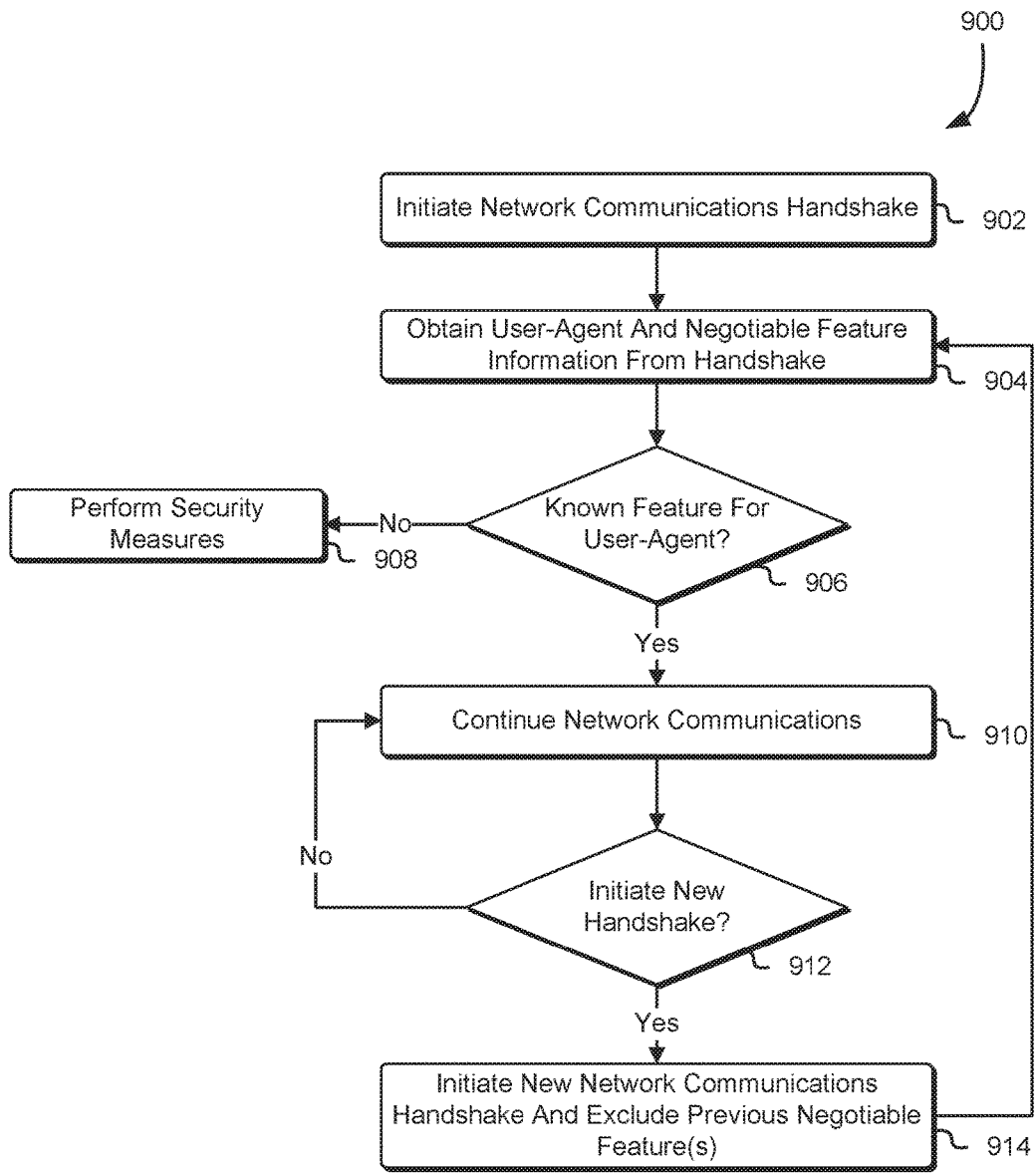
FIG. 9 shows an illustrative example of a process for utilizing one or more network communications handshakes to obtain one or more user-agent and corresponding negotiable features to determine the authenticity of the user-agent in accordance with at least one embodiment.

As noted above, the destination server may be configured to obtain a user-agent/cipher suite pairing from a user client to determine, either through a network security service or component, whether the user-agent header has been forged or manipulated. In some embodiments, if the user-agent header is known to the network security service or component (e.g., an entry within a user-agent database exists for the particular user-agent/cipher suite pairing), the destination server may continue network communications with the user client. In order to further ensure that the user-agent header has not been forged or otherwise manipulated, the network security service or component may cause the destination server to initiate a new handshake procedure and exclude any previously provided cipher suites, forcing the user client to submit a new cipher suite for the specified user-agent header. Accordingly, FIG. 9 shows an illustrative example of a process 900 for utilizing one or more network communications handshakes to obtain one or more user-agent and cipher suite pairings to determine the authenticity of the user-agent in accordance with at least one embodiment. The process 900 may be performed by the aforementioned destination server, which may be configured to receive a user-agent/cipher suite pairing from a user client and transmit the pairing to a network security service for analysis. Alternatively, the destination server may include a network security component, which may be used to perform the analysis of the received user-agent/cipher suite pairing.

In the process 900, a destination server may initiate a network communications handshake 902 with a user client in response to a HTTPS request from the user client to establish a secure communications channel. As part of this request, the user client may transmit to the destination server a user-agent header and corresponding one or more cipher suites, which may be used by the destination server to communicate with the user client through the secure communications channel. Thus, the destination server may obtain 904, from the user client, the user-agent header and corresponding one or more cipher suites.

As described above in connection with FIGS. 5 and 6, the destination server may either provide the received user-agent/cipher suite pairing to a network security service or may utilize a network security component to analyze this user-agent/cipher suite pairing. Accordingly, the network security service or component may access a user-agent database to determine whether the provided user-agent/cipher suite pairing is specified within the user-agent database and, if so, obtain the confidence score for the user-agent/cipher suite pairing. In some embodiments, if the user-agent/cipher suite pairing has not been specified within the user-agent database or the user-agent/cipher suite pairing has a confidence score that is below a certain threshold, the network security service or component may flag the user client and recommend certain security measures be performed. Thus, the network security service or component may transmit information related to the provided user-agent/cipher suite pairing to the destination server for further processing.

Utilizing the information provided from the network security service or component, the destination server may determine 906 whether the received user-agent/cipher suite pairing has been previously observed and, if so, whether the user-agent/cipher suite can be trusted. If the user-agent/cipher suite pairing is not specified within the user-agent database or has a confidence score below a certain threshold value, the destination server may perform 908 one or more security measures. For instance, as noted above, the destination server may terminate the connection between the user client and the destination server. Alternatively, the destination server may quarantine the user client such that the user client may only receive certain data and denying access to other more sensitive data, such as administrator data or user account information. If the user-agent/cipher suite pairing is specified within the user-agent database and has a sufficiently high enough confidence score to not cause the user client to be flagged, the destination server may continue 910 network communications with the user client. For instance, the destination server may complete the network communications handshake and enable data transmissions through the secure communications channel.

At a later time or in response to a triggering event (e.g., detection of unusual data activity, etc.), the network security service or component may transmit executable instructions to the destination server to initiate a new network communications handshake with the user client. Thus, the destination server may determine 912 whether it is necessary to initiate a new network communications handshake with the user client. If the destination server has not received an indication from the network security service or component that a new handshake should be initiated or insufficient time has passed since the previous network communications handshake, the destination server may continue 910 the network communications with the user client.

If sufficient time has passed since the previous network communications handshake or the destination server has received an indication from the network security service or component that a new handshake should be initiated, the destination server may initiate 914 a new network communications handshake and exclude any previously provided cipher suites. For instance, the destination server may reject any user-agent/cipher suite pairings provided by the user client that include a previously analyzed cipher suite. Thus, the destination server may be able to force the user client to provide a new cipher suite for the specified user-agent header. This may enable the destination server, through the network security service or component, to analyze this new user-agent/cipher suite pairing and determine whether the user-agent header has been forged or otherwise manipulated.

Figure 10:
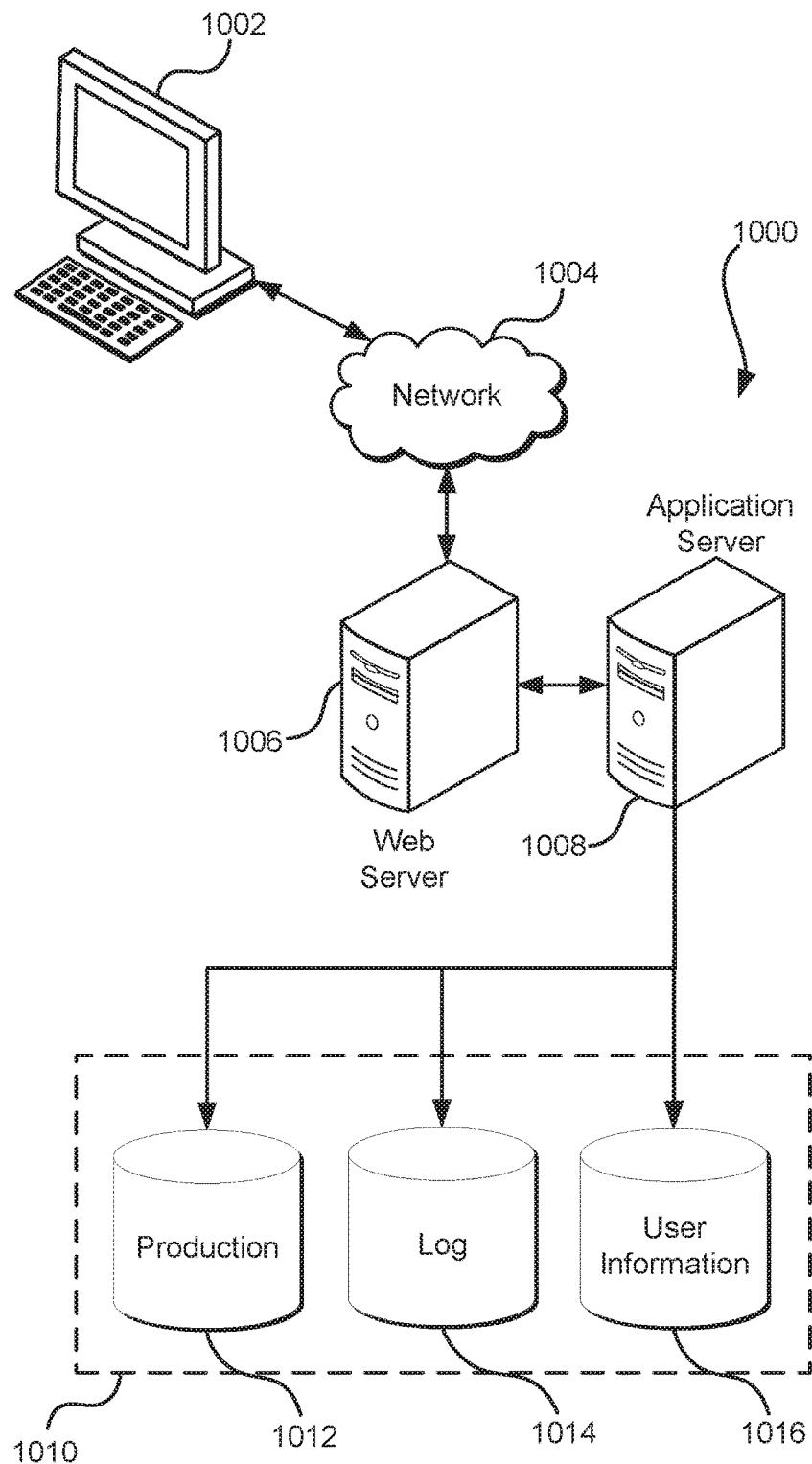
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
communicating, via a cryptographically protected communications session with a computer system, using cryptographically protected communications utilizing a first negotiable feature;
detecting, during the cryptographically protected communications with the computer system utilizing the first negotiable feature, a triggering event;
in response to the triggering event, causing the cryptographically protected communications with the computer system to change from the first negotiable feature to a second negotiable feature during the cryptographically protected communications session; and initiating a security measure as a result of stored data indicating that the computer system fails to support the second negotiable feature.

2. The computer-implemented method of claim 1, wherein the security measure includes terminating the cryptographically protected communications with the computer system.

3. The computer-implemented method of claim 1, wherein the stored data is from a database that associates user agents of the communications channel with negotiable features supported by the user agents.

4. The computer-implemented method of claim 1, wherein causing the cryptographically protected communications with the computer system to change from the first negotiable feature to the second negotiable feature is performed to exclude the first negotiable feature.

5. The computer-implemented method of claim 1, wherein the first negotiable feature is a first communications protocol and the second negotiable feature is a second communications protocol.

6. A system, comprising:
at least one computing device that implements one or more services, wherein the one or more services:
communicate, via a cryptographically protected communications session with a computer system, using communications utilizing a first negotiable feature, the first negotiable feature being usable by the computer system and the one or more services;
in response to a triggering event occurring during the communications with the computer system utilizing the first negotiable feature, cause the communications with the computer system to change from the first negotiable feature to a second negotiable feature during the cryptographically protected communications session; and
initiate a security measure as a result of stored data indicating that the computer system fails to support the second negotiable feature.

7. The system of claim 6, wherein
the one or more services further:
perform a first handshake to establish the cryptographically protected communications session; and
initiate a second handshake to cause the communications to change from the first negotiable feature to the second negotiable feature.

8. The system of claim 6, wherein the first negotiable feature is a first cipher suite and the second negotiable feature is a second cipher suite.

9. The system of claim 6, wherein the one or more services further detect the triggering event.

10. The system of claim 6, wherein causing the communications with the computer system to change from the first negotiable feature to the second negotiable feature is performed to reject any communications utilizing the first negotiable feature.

11. The system of claim 6, wherein the stored data associates classifications of user agents with supported negotiable features.

12. A non-transitory computer-readable storage medium having stored thereon executable instructions that, as a result of being executed by one or more processors of a computer system, cause the computer system to at least:
communicate, via a cryptographically protected communications session with a second computer system, using cryptographically protected communications utilizing a first feature;
in response to a triggering event occurring during the cryptographically protected communications with the second computer system, change the cryptographically protected communications with the second computer system from the first feature to a second feature during the cryptographically protected communications session; and
perform a security measure as a result of stored data indicating that the second computer system fails to support the second feature.

13. The non-transitory computer-readable storage medium of claim 12, wherein the first feature is a first cipher suite and the second feature is a second cipher suite.

14. The non-transitory computer-readable storage medium of claim 12, wherein communicating, with the second computer system, using the cryptographically protected communications is performed using a transport layer security protocol.

15. The non-transitory computer-readable storage medium of claim 12, wherein the stored data associates classifications of user agents with supported features.

16. The non-transitory computer-readable storage medium of claim 12, wherein the security measure includes enabling communications from the second computer system within a sandboxed environment.

17. The non-transitory computer-readable storage medium of claim 12, wherein
the instructions further cause the computer system to:
perform a first handshake to establish the cryptographically protected communications session; and
initiate a second handshake to cause the communications to change from the first feature to the second feature.

18. The non-transitory computer-readable storage medium of claim 12, wherein the instructions further cause the computer system to detect, based at least in part on data activity over the cryptographically protected communications utilizing the first feature, the triggering event.

19. The computer-implemented method of claim 1, further comprising:
performing a first handshake to establish the cryptographically protected communications session; and
initiating a second handshake to cause the cryptographically protected communications with the computer system to change from the first negotiable feature to the second negotiable feature during the cryptographically protected communications session.

20. The non-transitory computer-readable storage medium of claim 12, wherein the executable instructions that cause the computer system to change the cryptographically protected communications with the second computer system from the first feature to the second feature further cause the computer system to reject any communications utilizing the first feature.

* * * * *